United States Patent [19]

Hall

[11] 3,987,814

[45] Oct. 26, 1976

[54] FLOW RESPONSIVE POPPET RELIEF VALVE

[75] Inventor: Gerald D. Hall, Joliet, Ill.

[73] Assignee: Caterpillar Tractor Co., Peoria, Ill.

[22] Filed: Mar. 17, 1975

[21] Appl. No.: 558,751

[52] U.S. Cl. .............................. 137/469; 137/491
[51] Int. Cl.² ........................................ F16K 25/00
[58] Field of Search .................. 137/469, 471, 491; 251/365, 357

[56] References Cited
UNITED STATES PATENTS

| 103,062 | 5/1870 | Lynde ............................. 137/469 |
| 535,878 | 3/1895 | Woodward .................. 137/469 X |
| 2,032,613 | 3/1936 | Grove ............................ 137/491 |
| 2,622,613 | 12/1952 | McNeal ........................ 137/469 |
| 2,882,922 | 4/1959 | Schindel ....................... 137/491 |
| 2,980,132 | 4/1961 | Prijatel et al. ............... 137/469 |
| 3,018,792 | 1/1962 | Brucker ........................ 137/469 |

FOREIGN PATENTS OR APPLICATIONS

| 264,380 | 4/1929 | Italy .............................. 137/469 |

Primary Examiner—Alan Cohan
Attorney, Agent, or Firm—Charles E. Lanchantin, Jr.

[57] ABSTRACT

A flow responsive poppet relief valve includes a housing having an outlet chamber and an inlet passage opening thereon to define an annular valve seat therebetween, a spool disposed for axial movement in the housing and having a head with a conical nose portion thereon, a spring disposed intermediate the housing and the spool for biasing the conical nose portion axially closably against the valve seat and whereby the spool is axially openly moved away therefrom by a fluid in the inlet passage at a predetermined pressure, and an outwardly flared surface portion on the head for assuring that upon opening movement of the spool a relatively thin fluid stream is guided by the conical nose portion in axially relatively low force-transmitting impinging relation glancingly against the flared surface portion, and upon further opening movement of the spool a relatively thicker fluid stream is guided by the conical nose portion in axially relatively greater force-transmitting impinging relation against the flared surface portion, with the streams being deflectably diverted angularly outwardly therefrom to the outlet chamber, in order to assure a stable response and a relatively high degree of pressure regulation of the poppet relief valve.

6 Claims, 5 Drawing Figures

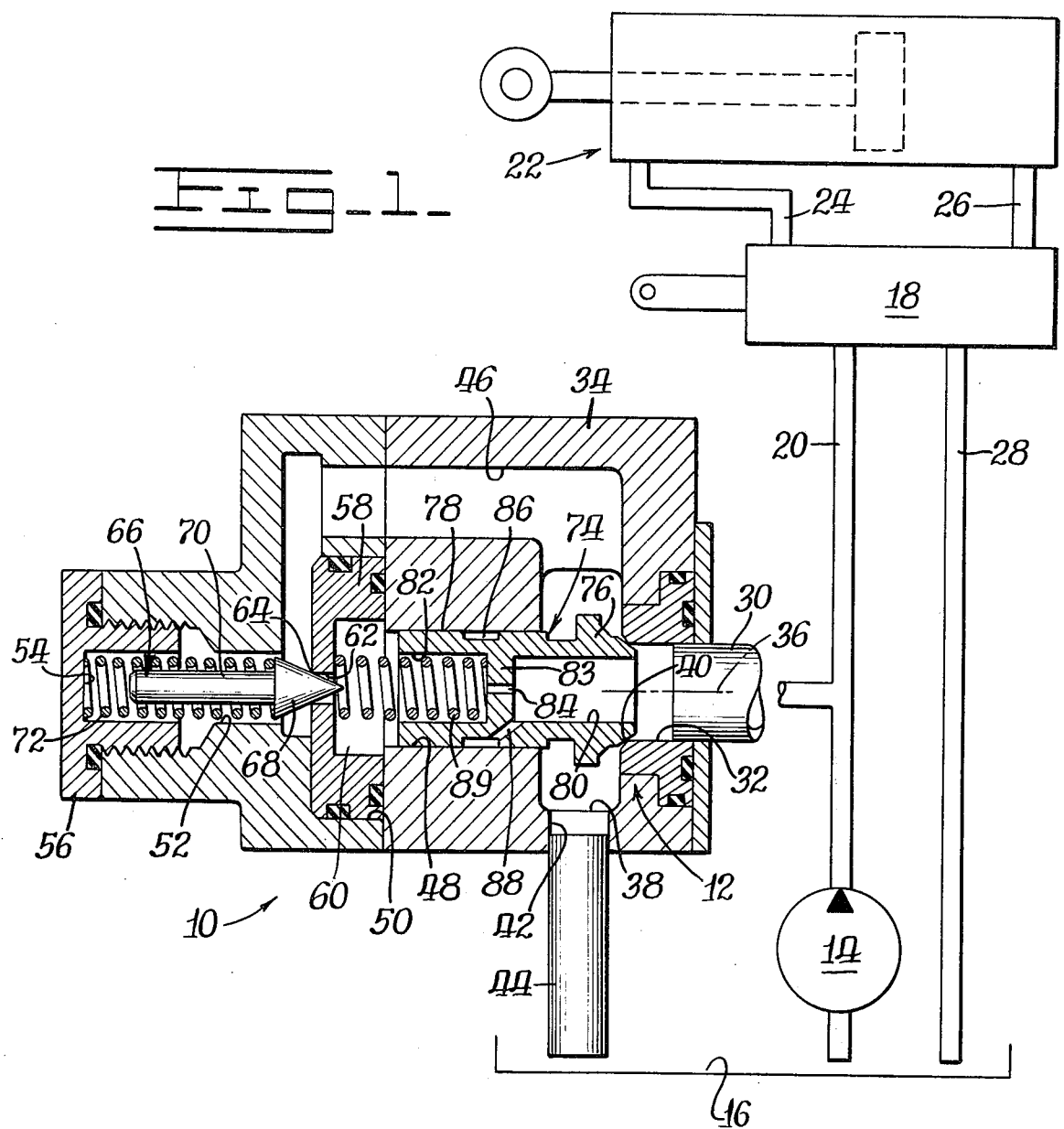
Fig_1_
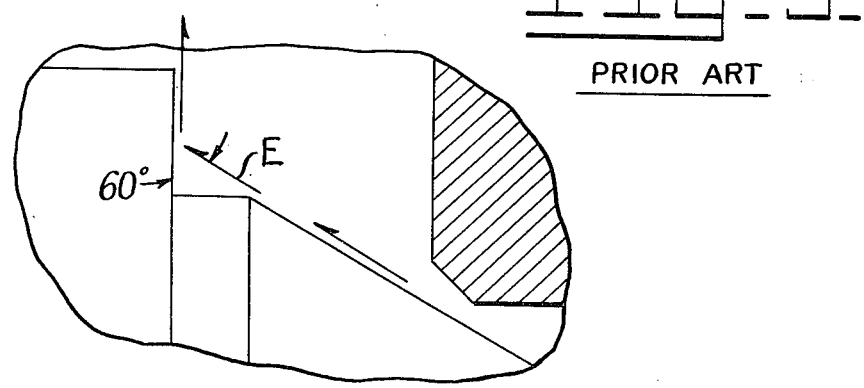
Fig_5_
PRIOR ART

FLOW RESPONSIVE POPPET RELIEF VALVE

BACKGROUND OF THE INVENTION

While spring-loaded poppet-type relief valves are widely used in a variety of hydraulic circuits, they frequently suffer from unstable response and regulation problems. Generally, these poppet relief valves include a spool with a conical head, and upon reaching a predetermined opening pressure, the spool moves to admit a cone of fluid through an annular orifice. Since this orifice necessarily increases in size with higher flow rates, the loading spring must be further compressed and complex fluid impingement and flow forces are exerted on the head of the poppet relief valve which create stability and regulation problems.

In connection with stability problems, it is apparent that a poppet relief valve should rapidly respond to various operating parameters with a minimum of fluctuation. Unfortunately, relatively erratic operation thereof is often observed at a certain flow rate. For example, rapid oscillation of these poppet valves between a fully open position and a nearly closed position is sometimes so severe that the resultant flow and pressure fluctuations are frequently audibly evident. At other times, while it cannot be heard, the extremely fast pressure changes are still felt by the associated circuit with an accompanying deleterious effect thereon.

These poppet relief valves should also exhibit a relatively flat, controlled pressure versus flow rate characteristic. This is referred to as pressure regulation and is defined as the variation in pressure over the full flow range expressed as a percentage of the pressure at maximum flow, or as follows:

$$\% \text{ Regulation} = \frac{\text{Press at max. flow} - \text{Press at min. flow}}{\text{Press at max. flow}} \times 100$$

Heretofore, 15% regulation was generally considered acceptable. But this undesirably high percentage was actually acceptable only as a compromise, since it was known that with a lower percentage of regulation the likelihood of significant stability problems greatly increases.

Reference is made to U.S. Pat. No. 3,199,532 issued Aug. 10, 1965 to R. E. Trick for a poppet relief valve constructed to overcome at least a portion of the aforementioned problems. It does this by closely controlling the diametrical clearance between an annular collar on the poppet valve head and the bore in which it is received, and also by controlling the axial position of the collar with respect to an annular outlet groove to provide an auxiliary, velocity compensating orifice in series with the primary regulating orifice, and a secondary pressure within an entry chamber which imposes loads on the poppet valve. It is apparent that the precise dimensional control required during the manufacture of both the valve head and its associated housing is very expensive. Moreover, even with this added complexity, the poppet relief valve fo U.S. Pat. No. 3,199,532 is not believed to have both the combination of good stability and a regulation level below 10%. This combination is particularly hard to achieve when these poppet relief valves are used in high pressure circuits, for example, above 2000 psi (140 Kg per sq. cm.). Still further, these problems are compounded when they are expected to handle a relatively broad flow range, for example, from zero to 130 gpm (0 to 8.2 liters per sec.).

SUMMARY AND OBJECTS OF THE INVENTION

Therefore, to overcome the aforementioned problems, it is an object of the present invention to provide an improved poppet relief valve exhibiting a relatively flat controlled pressure versus flow rate characteristic.

Another object of this invention is to provide such a poppet relief valve having a relatively rapid, yet stable response.

Another object of the invention is to provide an economical poppet relief valve of the character described which is responsive in a compensating manner to the fluid flow forces angularly impinging thereon and through a relatively broad range of fluid flow rates.

Other objects and advantages of the present invention will become more readily apparent upon reference to the accompanying drawings and following description.

BRIEF DESCRIPTION OF THE DRAWINGS

FIG. 1 is a schematic diagram of a hydraulic circuit with a portion thereof in section and including a flow responsive poppet relief embodying the features of the present invention therein.

FIG. 5 is an enlarged fragmentary plan view of a conventional poppet relief valve head for purposes of comparison with FIGS. 2, 3, and 4 of the present invention.

DESCRIPTION OF PREFERRED EMBODIMENT

Figure 2:
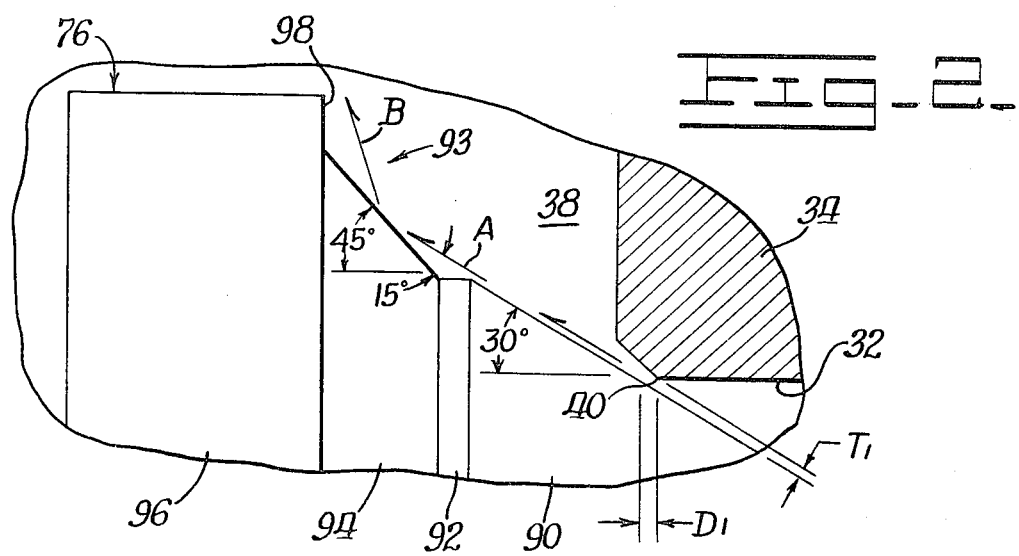
FIG. 2 is an enlarged fragmentary plan view of the outwardly flaring head portion of the flow responsive poppet relief valve of FIG. 1 to better illustrate details of construction thereof, and shown in an open position corresponding to relieving fluid at a relatively low flow rate.

With reference to FIG. 1 of the drawings, a hydraulic circuit 10 is shown which includes the flow responsive poppet relief valve of the present invention therein, as generally indicated by the reference numeral 12. The hydraulic circuit also includes a driven hydraulic pump 14 for communicating fluid from a reservoir 16 to a selector valve 18 by way of a normally pressurized inlet conduit 20. Upon manually operating the selector valve, fluid is communicated from the inlet conduit to either end of a double acting hydraulic jack 22 through a conduit 24 or a conduit 26, and to relieve fluid from the opposite end of the jack by way of a drain conduit 28 to the reservoir.

The poppet relief valve 12 of the present invention serves to limit the maximum operating pressure of the hydraulic circuit 10 by being in fluid-relieving communication with the inlet conduit 20 by way of a branch conduit 30, and a cylindrical inlet passage 32 formed in a valve housing 34. The inlet passage has a central longitudinal axis 36 and opens outwardly into an annular outlet chamber 38 in the housing to thereby define an annular valve seat 40 therebetween. The outlet chamber is in open communication with the reservoir 16 through an outlet passage 42 and a drain conduit 44. Also, an internal passage 46 is formed in the housing in open communication with the chamber on the opposite side thereof so that fluid therein may return to the reservoir. A valve bore 48 having a diameter slightly larger than the valve seat and a retainer bore 50 are also serially formed in the housing along the axis 36. Further, a pilot poppet bore 52 opens on the internal passage 46 and is arranged on the axis in generally aligned relation with a cylindrical pocket 54 defined in an externally threaded retaining member 56 which is screw threadably received by the housing.

Upon further reference to FIG. 1, it is apparent that a cylindrical retaining cup 58 is sealingly disposed in the retainer bore 50 of the housing 34 in such a manner that at internal spring chamber 60 defined therein opens on the valve bore 48. A cylindrical through passage 62 and an annular pilot poppet valve seat 64 are also formed centrally in the cup, and a conventional pilot poppet relief valve 66 is beneficially employed therewith. The pilot poppet valve has a conical head 68 and a reduced diameter elongated stem 70 extending therefrom, and a relatively stiff or high rate compression spring 72 is seated intermediate the pocket 54 of the retaining member 56 and the pilot poppet head to bias it into closed engagement with the valve seat. Upon reaching a predetermined pressure of, for example, 2300 psi (162 Kg per sq. cm.) in the chamber 60, the pilot poppet relief valve opens to permit fluid flow from the chamber to the internal passage 46.

In accordance with the present invention, the flow responsive poppet relief valve 12 includes a poppet spool 74 having a radially outwardly flaring head 76 which is generally disposed within the outlet chamber 38, and an enlongated cylindrical body 78 which is disposed for sealed axial sliding movement in the valve bore 48. A cylindrical pocket 80 and a spring-receiving pocket or seat 82 are formed inwardly from the opposite ends of the spool to thereby provide a relatively narrow width wall 83 centrally thereof in which is disposed a flow-controlling orifice 84. Also, in a beneficial manner, an annular groove 86 is disposed around the periphery of the spool and an oblique passage 88 normally communicates pressurized fluid from the inlet passage 32 to the annular groove via the pocket 80 in order to hydraulically balance and center the spool for improved response.

Pursuant to the present invention, the poppet spool 74 is biased rightwardly as viewed in FIG. 1 by a relatively light rate compression spring 89 which is disposed in the pocket 82 and seated against the retaining cup 58. Thus, the outwardly flaring head 76 of the spool is urged into closed engagement with the annular valve seat 40 in axially facing relation to the inlet passage 32. As best shown in the enlargement of FIG. 2, the outwardly flaring head includes in serially arranged order a conical nose portion 90, a cylindrical step 92, and an outwardly flared, fluid diverting surface portion identified generally by the reference numeral 93. More particularly, the fluid diverting surface portion preferably includes a gradually sloping leading portion or frustoconical surface 94, and an annular flange 96 providing a more steeply sloping shoulder portion or annular surface 98 about its periphery which is disposed in a plane at a substantially right angle to the axis 36. It is apparent from the illustration that the conical nose portion 90 has a cone angle of approximately 60° and the frustoconical surface 94 formed downstream thereof has a cone angle of approximately 90°, so that with initial opening of the poppet relief valve 12, a relatively thin conical stream of fluid is relieved leftwardly when viewing FIG. 2 from the inlet passage into the outlet chamber 38 and directed impingingly against the frustoconical surface at a relatively low angle of incidence. Thus, the operating condition of FIG. 2 corresponds to relieving fluid at a relatively low flow rate, and pursuant to one aspect of the invention the relatively low angle of incidence or impingement of the fluid on the outwardly flared surface portion 93, and particularly the frustoconical surface 94, is such as to cause a relatively low axial force serving to lift the outwardly flaring head 76 away from the valve seat 40.

Figure 3:
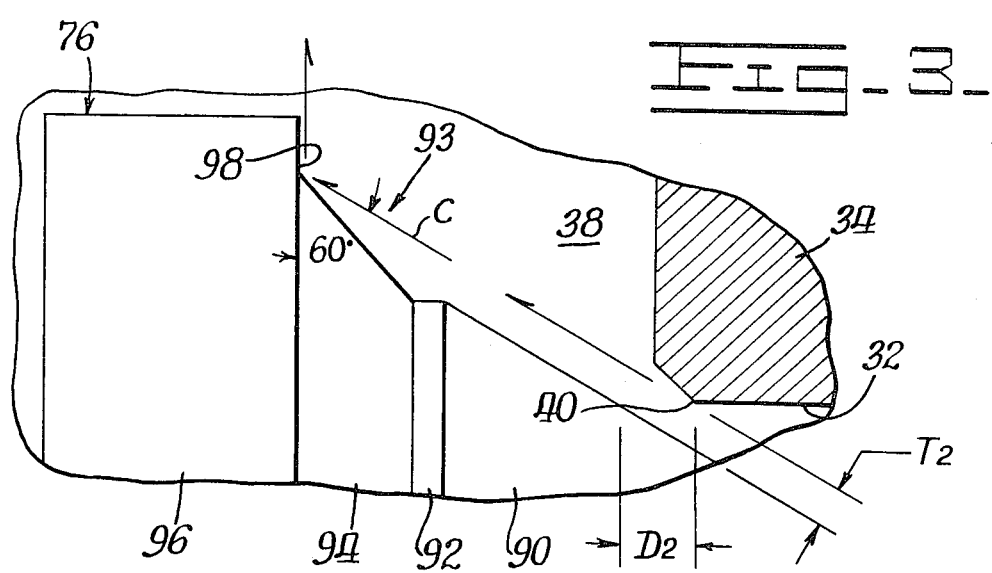
FIG. 3 is an enlarged fragmentary plan view of the outwardly flaring head portion of the flow responsive poppet relief valve of the present invention somewhat comparable to FIG. 2, but shown in a more widely open position corresponding to relieving fluid at a relatively high flow rate.

However, pursuant to another aspect of the present invention, further leftward opening movement of the flow responsive poppet relief valve 12 corresponding to the position shown in FIG. 3 permits a thicker conical stream of fluid to be relieved outwardly to the chamber 38. Subsequently at least a portion of the thicker stream impinges on the outwardly flared surface portion 93 at an effectively greater angle of incidence. This greater angle of incidence of the fluid adjacent the intersection of the frustoconical surface 94 and annular surface 98 provides a predetermined greater amount of lift, or leftward axial force tending to open the poppet relief valve and hence greater magnification of the flow forces acting on the outwardly flaring head 76.

In this manner the flared surface portion 93 of the poppet relief valve 12 of the present invention is profiled for facing exposure to a relatively thin conical fluid stream at a predetermined axially low force transmitting rate coinciding with the low angle of incidence, and is additionally profiled for axially greater force-transmitting response to a relatively thicker conical fluid stream coinciding with a portion thereof impinging thereon at a relatively greater angle of incidence. Such proportioned lift, in opposition to the force of the compression spring 89, greatly increases the stability of the valve and establishes a more constant flow rate for a given pressure level in the inlet passage 32.

OPERATION

While the operation of the present invention is believed clearly apparent from the foregoing description, further amplification will subsequently be made in the brief summary of such operation. With reference to FIG. 1, and assuming that the hydraulic pump 14 is started to direct fluid at gradually increasing pressure to the inlet conduit 20, the branch conduit 30 and the inlet passage 32, fluid passes through the flow-controlling orifice 84 in the closed poppet relief spool 74 and pressure rises in the spring chamber 60. When the pressure in the chamber reaches the predetermined opening pressure of approximately 2300 psi (162 Kg per sq. cm.), the pilot poppet valve 66 opens or moves to the left when viewing FIG. 1 away from its seat 64 in opposition to the loading of the spring 72. Fluid is then relieved from the spring chamber to the internal or relief passage 46 at the rate of fluid flow through the flow-controlling orifice 84. Upon establishing a relatively low but predetermined pressure drop across the orifice, the chamber pressure is lowered sufficiently with respect to the pressure in the inlet passage 32 that the main poppet relief spool 74 opens to relieve fluid relatively directly from the inlet passage to the outlet chamber 38 and back to the reservoir 16. Thus, the main poppet relief spool opens at a pressure slightly above that required to open the pilot poppet valve.

It will be appreciated that the flow responsive poppet relief valve 12 is substantially immediately responsive to the pressure changes in the inlet passage 32 because of the relatively small mass of the main poppet spool 74, its low rate spring 89, and the intercooperation between the flow-controlling orifice 84 in the poppet spool and the pilot poppet valve 66. Further, pursuant to the present invention, the outwardly flaring head portion 76 of the main poppet spool includes at least two annular surfaces 94 and 98 thereon that are individually disposed in a predetermined angular facing relation with respect to the stream of fluid impinging thereon to gain minimal force assisting the lift, or leftward movement openly away from the annular valve seat 40, when relieving fluid at a relatively low flow rate, and yet to gain additional force assisting the lift when operating at a relatively high flow rate.

This predetermined proportionate gain capability of the outwardly flaring head 76 of the main poppet spool 74 is better appreciated with reference to FIGS. 2 and 3. In FIG. 2, the spool is initially opened a distance $D_1$, to permit a relatively thin conical fluid stream of thickness $T_1$ to impinge on the outwardly flared surface portion 93 as indicated by the arrow identified by the letter A. As illustrated, this thin stream beneficially impinges substantially centrally upon the frustoconical surface 94 at a relatively low angle of incidence of approximately 15° due to the flow directing cooperative relationship of the conical nose portion 90 and the cylindrical step 92. Preferably, this surface is only gradually inclined or flared outwardly at an angle of incidence within the range of from 10° to 20° with respect to the nose portion. Thereafter, this thin stream makes minimal contact with the annular flange 96 at the shoulder 98 because it is primarily deflected obliquely outwardly thereof as indicated by the arrow identified by the letter B. This greatly enhances the stability of the poppet relief valve 12 of the present invention at relatively low flow rates.

As shown in FIG. 3, however, when the poppet spool 74 is opened to a greater axial distance $D_2$ between the conical nose portion 90 and the valve seat 40, a relatively thicker conical fluid stream of thickness $T_2$ is permitted to impinge on the outwardly flared surface portion 93. But, as illustrated by the arrow identified by the letter C, at least the radially outermost portion of the stream impinges further outwardly on the flared surface portion adjacent the intersection of the frustoconical surface 94 and annular surface 98. Thus, a portion of the relatively thicker conical fluid stream impinges substantially directly on the annular surfaces over a greater surface area and at an angle of incidence of approximately 60°, as illustrated, or preferably within the range of approximately 50° to 70° when the poppet spool is relieving at a relatively high flow rate. This results in a significantly magnified axial force tending to open the spool, or greater valve lift and, hence, improved overall regulation of the relief valve.

The illustrated flow responsive or flow compensating poppet relief valve of the present invention has advantageously exhibited a relatively rapid rate of response while also being stable in its flow controlling functions. In addition, it has exhibited a relatively flat, controlled pressure versus flow rate characteristic with an observed regulation of approximately 8%.

The aforementioned operation is in marked contrast to the uncontrolled response of a conventional poppet relief valve as shown in the fragmentary enlargement of FIG. 5, for example. It is clearly apparent that even with a relatively low rate of fluid flow, the stream impinges at a relatively abrupt angle of incidence of approximately 60° upon the shoulder of the valve head as illustrated by the arrow identified by the letter E. Thereafter, further opening of the prior art valve generally retains the same angle of incidence. Consequently, the valve is unstable, particularly at low flow rates, and tends to oscillate in an undesirable manner as set forth above in the background of the invention.

DESCRIPTION OF ALTERNATE EMBODIMENT

Figure 4:
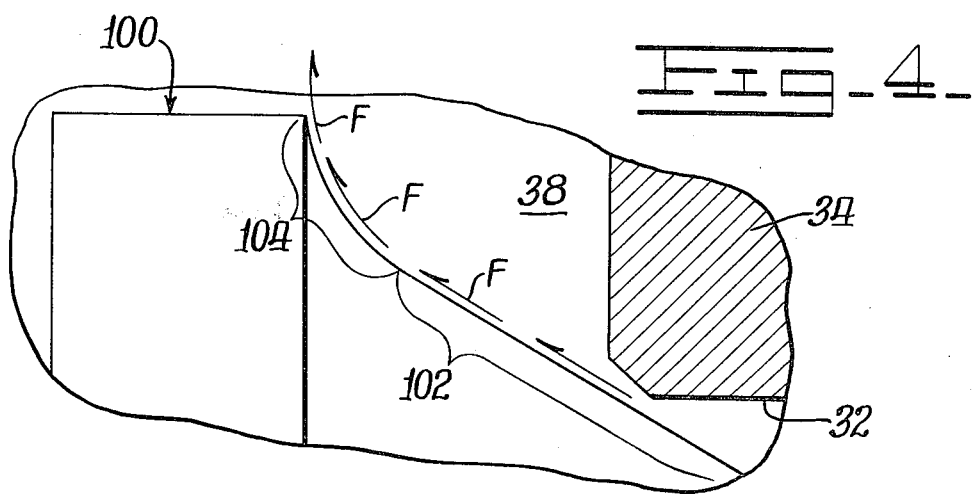
FIG. 4 is an enlarged fragmentary plan view of an alternate embodiment of the outwardly flaring head portion of the flow responsive poppet relief valve of the present invention.

It is to be appreciated that the outwardly flaring head of the present invention may be modified to still permit proportioned biasing of the poppet relief valve in response to the flow rate without departing from the spirit of the present invention. In this connection, reference is made to the alternate embodiment of FIG. 4 which illustrates an outwardly flaring head 100 including a conical nose portion 102 and a smoothly progressively outwardly flaring surface portion generally indicated within the confines of the bracket 104. With low flow rates the fluid would tend to follow the contiguously smooth cooperating surfaces of these two portions as indicated by the arrows identified by the letter F. With higher flow rates, however, the thicker stream of fluid traveling over the conical nose portion would tend to impinge further radially outwardly upon the smoothly flared surface portion at a proportionally steeper angle of incidence and over a greater peripheral surface area to thereby effect greater valve spool lift in a manner comparable to the preferred embodiment. While the preferred embodiment has at least two angularly inclined annular surfaces of greater angularity than the conical nose portion, the alternate embodiment may be considered as having an infinite number of juxtaposed annular surfaces of gradually increasing conical angularity with respect to the central longitudinal axis 36.

In view of the foregoing, it is readily apparent that the poppet relief valve 12 of the present invention is responsive to flow thereon in a compensating manner to provide both a stable response and a high degree of pressure regulation, which combination has been heretofore elusive. The valve is also economical in its construction, and is adaptable for use in both high pressure and broad flow range hydraulic circuits.

It is to be further appreciated that the flow responsive poppet relief valve 12 of the present invention need not be utilized with the pilot poppet valve 66, but rather can be directly opened by exposure to a predetermined pressure within the inlet passage 32 in opposition to the biased loading of solely the compression spring 89, since the chamber 60 could then be arranged in open communication with the reservoir 16.

While the invention has been described and shown with particular reference to a preferred embodiment, it will be apparent that variations might be possible that would fall within the scope of the present invention, which is not intended to be limited except as defined in the following claims.

What is claimed is:

1. A flow responsive poppet relief valve comprising;

a housing having a bore and an inlet passage arranged along an axis, and an outlet chamber therebetween defining an annular valve seat with said inlet passage;

a poppet spool axially movable in said bore and including a head with a conical nose portion thereon having a first angular relationship with respect to said axis;

a spring disposed intermediate said housing and said spool for biasing said conical nose portion closably against said valve seat, and whereby said spool is axially opened by a fluid in said inlet passage at a predetermined pressure;

a gradually sloping frustoconical surface having a second angular relationship to said axis which is moderately greater than said first angular relationship formed on said head of said spool downstream of said conical nose portion and facingly arranged for exposure to the impingement of a relatively thin conical stream of fluid thereon at a relatively gradual angle of incidence within the range of approximately 10° to 20° when said spool is relieving fluid at a relatively low flow rate, and thus a reaction on said spool a relatively smaller proportion of which is an axial component; and a steeply sloping shoulder portion having an angular relationship to said axis greater than said second angular relationship formed on said head in juxtaposed downstream relation to said frustoconical surface and facingly arranged for exposure to the impingement of at least a portion of a relatively thicker conical stream of fluid thereon at a greater angle of incidence when said spool is relieving fluid at a relatively high flow rate, and thus a reaction a relatively larger proportion of which is an axial component in order to achieve a stable response through a broad flow range and a relatively high degree of pressure regulation.

2. The flow responsive poppet relief valve of claim 1 wherein said conical nose portion has a cone angle of approximately 60° and said frustonconical surface is formed on a cone angle of approximately 90°.

3. The flow responsive poppet relief valve of claim 1 wherein said steeply sloping shoulder portion is disposed in a plane at substantially a right angle to said axis.

4. The flow responsive poppet relief valve of claim 1 including a cylindrical step on said head which is serially disposed intermediate said conical nose portion and said frustoconical surface.

5. The flow responsive poppet relief valve of claim 1 wherein a portion of said relatively thicker fluid stream impinges against said more steeply sloping shoulder portion at an angle of incidence within the range of approximately 50° to 70° when said spool is relievably operating at relatively high flow rates.

6. A flow reponsive poppet relief valve spool comprising, an elongated cylindrical body having a central longitudinal axis, seat means on said body for spring biased loading thereof in a first axial direction, a head portion on said body including an endwardly extending conical nose portion disposed on said axis, and an outwardly flared surface portion formed on said head portion including a cylindrical step disposed axially inwardly of said nose portion, a gradually sloping surface disposed in radially enlarged concentric relation axially inwardly of said step and a more steeply sloping shoulder portion disposed in radially enlarged concentric relation axially inwardly of said gradually sloping surface portion for controlled fluid flow responsive biased loading thereof in a direction opposite to said first axial direction.

* * * * *